United States Patent [19]
Kaneko et al.

[11] Patent Number: 5,381,398
[45] Date of Patent: Jan. 10, 1995

[54] INFORMATION SIGNAL REPRODUCING SYSTEM HAVING AMPLIFIER WITH SELECTIVELY DECREASED GAIN

[75] Inventors: Nobuyuki Kaneko, Kokubunji; Nobumitsu Chiyomatsu, Hachioji, both of Japan

[73] Assignee: Olympus Optical Co., Ltd., Tokyo, Japan

[21] Appl. No.: 117,642

[22] Filed: Sep. 8, 1993

Related U.S. Application Data

[63] Continuation of Ser. No. 742,384, Aug. 8, 1991, abandoned.

[30] Foreign Application Priority Data

Aug. 9, 1990 [JP] Japan ............................ 2-209101

[51] Int. Cl.⁶ ............................................. G11B 7/00
[52] U.S. Cl. ................................... 369/124; 369/100
[58] Field of Search ................... 369/124, 44.29, 44.31, 369/44.35, 44.36, 100

[56] References Cited

U.S. PATENT DOCUMENTS

| 5,005,163 | 4/1991 | Yamamoto et al. | 369/44.36 |
| 5,124,967 | 6/1992 | Isaka et al. | 369/44.35 |

FOREIGN PATENT DOCUMENTS

| 61-045421 | 3/1986 | Japan | 369/44.32 |
| 01165036 | 6/1989 | Japan | 369/124 |
| 02078032 | 3/1990 | Japan | 369/124 |

*Primary Examiner*—Aristotelis Psitos
*Assistant Examiner*—P. W. Huber
*Attorney, Agent, or Firm*—Stevens, Davis, Miller & Mosher

[57] ABSTRACT

An information signal reproducing circuit for use in an optical information recording/reproducing apparatus, includes a photo detector, a plurality of amplifiers and a plurality of couplings for connecting the amplifiers to each other in a serial manner. A gain of a signal produced by the photo detector is decreased only for a time period during which information is recorded or erased in the information recording/reproducing apparatus. Therefore, in case the amplifiers are serially connected to each other by means of AC couplings, information signal can be correctly read out without being influenced by transients of capacitors constituted of the AC couplings. In case the amplifiers are serially connected to each other by means of DC couplings, information signal can be correctly read out without causing a latch up.

17 Claims, 10 Drawing Sheets

*PRIOR ART*

FIG. 2A Output of Photo Detector

FIG. 2B Output of Amplifier 2

FIG. 5

FIG._6A WGSW Signal
FIG._6B Output of Amplifier 2
FIG._6C Output of Capacitor C1
FIG._6D Input of Amplifier 3

FIG._7

FIG.8A WGSW Signal

FIG.8B Output of Amplifier 2

FIG.8C Input of Amplifier 3

FIG_9

FIG_10A
WGSW Signal

FIG_10B
Output of Amplifier 2

FIG_10C
Input of Amplifier 3

FIG_11

FIG.12A *WGSW Signal*

FIG.12B *Output of Amplifier 2*

FIG.12C *Input of Capacitor C1*

FIG.12D *Input of Amplifier 3*

FIG._13

FIG._14A WGSW Signal

FIG._14B Output of Amplifier 2

FIG._14C Input of Amplifier 3

FIG. 15

FIG. 16A WGSW Signal

FIG. 16B Output of Amplifier 2

FIG. 16C Input of Circuit 5

INFORMATION SIGNAL REPRODUCING SYSTEM HAVING AMPLIFIER WITH SELECTIVELY DECREASED GAIN

This application is a continuation of application Ser. No. 07/742,384, filed Aug. 8, 1991 (abandoned).

BACKGROUND OF THE INVENTION

1. Field of the Invention

The present invention relates to an information signal reproducing circuit for use in an optical information recording/reproducing apparatus, in which information is recorded on an optical information recording medium such as optical disc, opto-magnetic disc and optical card by projecting a light beam having a high power on the information recording medium and information recorded on the information recording medium is reproduced by detecting a light beam reflected by the optical record medium, whose power is lower than the light beam used for recording information.

2. Description of the Related Art

Figure 1:
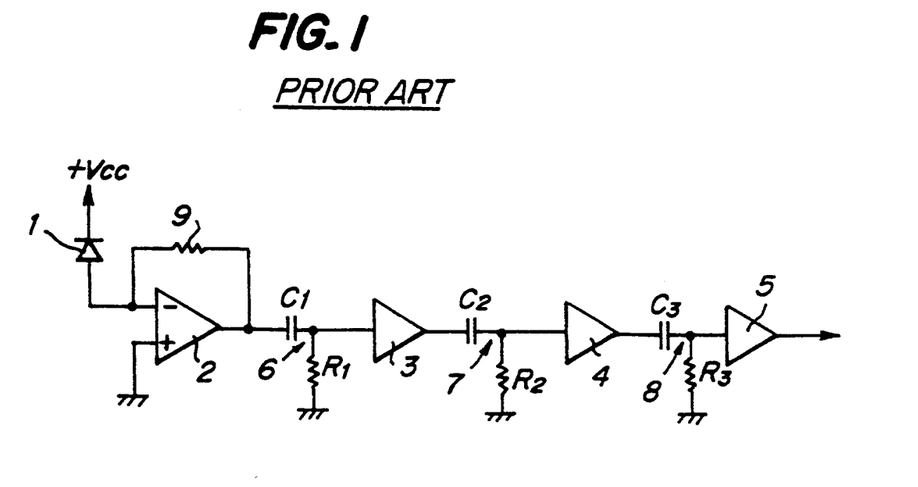
FIG. 1 is a schematic view showing a construction of a conventional information signal reproducing circuit.

FIG. 1 shows a construction of a conventional information signal reproducing circuit used in the optical information recording/reproducing apparatus. The information signal reproducing circuit comprises a photo detector 1 for receiving a reflection light beam reflected by an optical information recording medium and producing an electric signal in response to the reflection light beam; a plurality of amplifiers 2, 3 and 4, by which the electric signal produced by the photo detector 1 is successively amplified; and a wave shaping circuit 5 in which a waveform of the electric signal amplified by the amplifiers 2, 3 and 4 is shaped. The amplifiers 2, 3 and 4 and the wave shaping circuit 5 are connected to each other in series by means of AC couplings 6, 7 and 8, respectively. Each of the AC couplings is constituted of a capacitor ($C_1$, $C_2$, $C_3$) and a resistor ($R_1$, $R_2$, $R_3$). It should be noted that each resistor ($R_1$, $R_2$, $R_3$) is connected to the ground; and a first amplifier 2 serves as a differential amplifier having a feedback resister 9 to convert an output electric current signal of the photo detector 1 into an amplified electric voltage signal.

The conventional information signal reproducing circuit mentioned in the above has drawbacks stated in the below.

Figure 2A:
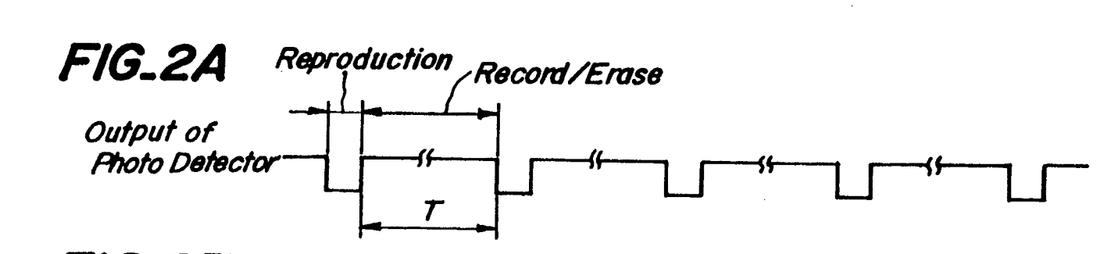
FIG. 2A is a schematic view depicting a waveform of an output signal of a photo detector provided in the circuit shown in FIG. 1.
Figure 2B:
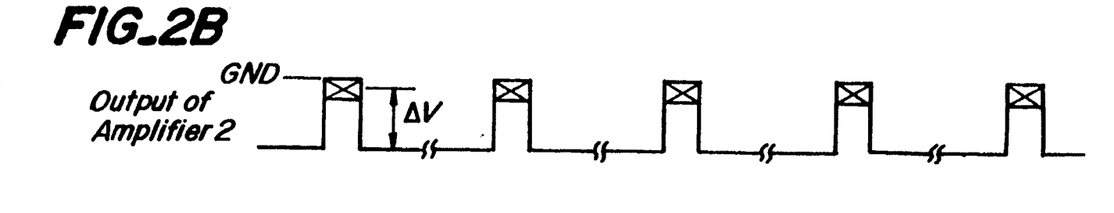
FIG. 2B is a schematic view illustrating a waveform of an output signal of a first amplifier arranged in the circuit shown in FIG. 1.

In the optical information recording/reproducing apparatus, in order to record information data on a desired data recording region, it is necessary to reproduce preformat information recorded in a preformat recording region. A light beam having a high power is necessary to record information data on the optical information recording medium or to erase information data which has been already recorded on the medium; but a light beam having a small power is enough to reproduce information data recorded on the medium. When information data is recorded on or erased from the optical information recording medium in the optical information recording/reproducing apparatus, the output electric current of the photo detector 1 becomes large in proportion to the power of light beam being made incident upon the medium, as shown in FIG. 2A. In the conventional information signal reproducing circuit shown in FIG. 1, the output of the photo detector 1 is always successively supplied to the amplifiers 2, 3 and 4 and the wave shaping circuit 5 under the same condition. Therefore, in the conventional circuit, when an operational mode is changed from an information reproducing mode to an information recording/erasing mode in the information recording/reproducing apparatus, a DC variable component $\Delta V$ of an output of the first amplifier 2 becomes very large as shown in FIG. 2B; and then an influence of a transient of the first AC coupling 6, which is caused when electric charge is charged or discharged in the first capacitor C1 of the AC coupling 6, also becomes large.

By suitably setting time constants of the AC couplings 6, 7 and 8 small, it is possible to converge the transient, generated in the AC coupling when the operation mode is changed in the information recording/reproducing apparatus, into a static DC level within a short time period. However, if the time constants of the AC couplings 6 to 8 are settled too small, low frequency component in an information signal spectrum could not be transmitted through the amplifiers of the information signal reproducing circuit, so that information recorded on the medium could not be reproduced correctly. Further, if the time constants of the AC couplings are determined so large, the information signal can be transmitted through the AC couplings, but not only preformat information, which is reproduced just after the operational mode, is changed from the recording/erasing mode to the reproducing mode but also information data recorded on an information recording region successively formed after a preformat information recording region could not be reproduced correctly due to an influence of the transient of the AC couplings 6 to 8.

Therefore, in the convention information signal reproducing circuit, in order to reproduce preformat information and information data in a correct manner, the time constants C1R1, C2R2, C3R3 of the respective AC couplings 6 to 8 should be determined so as to satisfy the following conditions.

$$1/T < \tfrac{1}{2}\pi C1R1 < f_0$$

$$[\tfrac{1}{2}\pi C2R2, \tfrac{1}{2}\pi C3R3] \leq f_0$$

wherein, T represents a time period during which information data is recorded/erased in the information recording/reproducing apparatus, and $f_0$ represents a lower limit frequency of the information signal spectrum.

However, it is extremely difficult to settle the time constants in the AC couplings 6 to 8 so as to satisfy the above mentioned conditions. Further, even when the time constants of the AC couplings 6 to 8 satisfying the above mentioned conditions can be settled, if the reflectance of the used optical recording medium is so high or the sensitivity of the medium is so low that a light beam having a high power is necessary to record/erase information data on the medium, the output of the photo detector 1 becomes large. Therefore, the reproduction of information data might be influenced by the transient of the AC couplings 6 to 8; and then the preformat information and information data recorded in the recording region after the preformat information recording region could not be reproduced in a correct manner.

Figures 3, 4A, 4B:
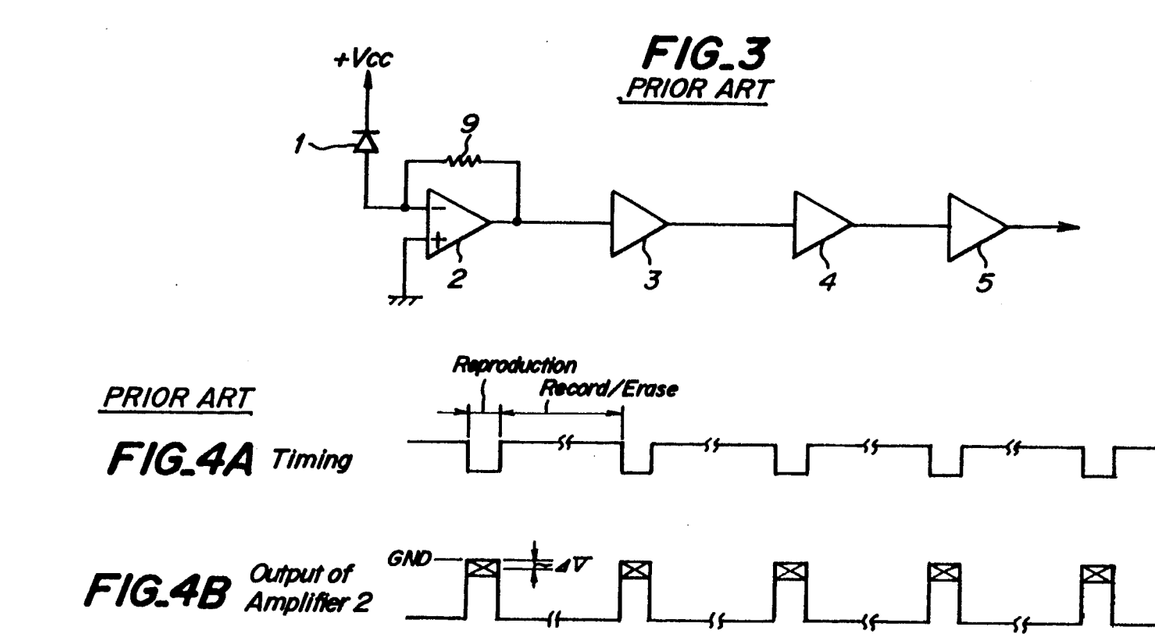
FIG. 3 is a schematic view representing a construction of another conventional information signal reproducing circuit.
FIG. 4A is a schematic view showing a waveform of an output signal of a photo detector provided the circuit represented in FIG. 3.
FIG. 4B is a schematic view depicting a waveform of an output signal of a first amplifier provided in the circuit represented in FIG. 3.
Figure 4C:
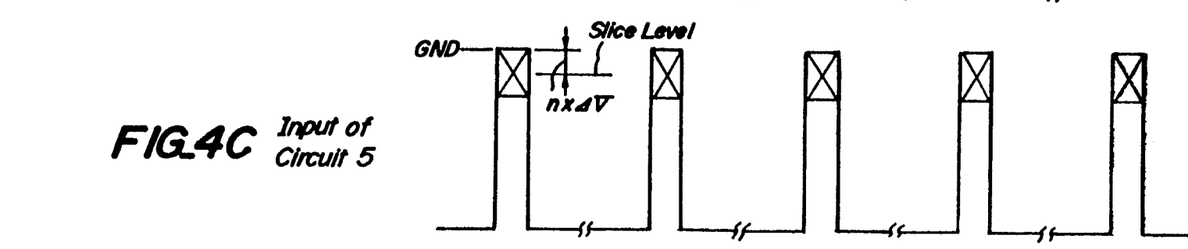
FIG. 4C is a schematic view illustrating a waveform of an input signal of a waveform shaping circuit arranged in the circuit represented in FIG. 3.

FIG. 3 is a schematic view showing a construction of the other conventional information signal reproducing circuit, in which the amplifiers 2, 3 and 4 and the wave shaping circuit 5 are connected to each other in series by means of DC couplings. FIG. 4A is a schematic view depicting a timing at which the operational mode is varied between reproducing mode and recording/erasing mode in the information recording/reproducing apparatus; FIG. 4B is a schematic view illustrating a waveform of an output signal of the amplifier 2; and FIG. 4C is a schematic view representing a waveform of an input signal of the wave shaping circuit 5. As clear from FIGS. 4B and 4C, the input signal of the wave shaping circuit 5 is about n times of the output signal of the amplifier 2. It should be noted that n represents a multiple of gains of the amplifiers 3 and 4. Therefore, by setting a slice level in the wave shaping circuit 5 at $n \times \Delta V$ with respect to the DC component of the preformat information reproducing signal, which is shown in FIG. 4B, to shape the waveform of the input signal of the circuit 5, it is possible to correctly reproduce the preformat information just after the operational mode is changed from recording/erasing mode to reproducing mode.

However, in the information signal reproducing circuit having DC couplings, in case that amplifiers having a large gain are used, the amplifiers are sometimes latched up due to saturation when a DC offset or a DC drift is generated in the information signal.

SUMMARY OF THE INVENTION

The present invention has for its object to provide a novel information signal reproducing circuit for use in an optical information recording/reproducing apparatus, in which it is possible to easily settle time constants of AC couplings at desired values and preformat information and information data recorded in a region following a preformat information recording region can be always reproduced in a correct manner without being influenced by the characteristics of a recording medium used in the apparatus and DC offset or DC drift.

In order to carry out the above mentioned object, an information signal reproducing circuit for use in an optical information recording/reproducing apparatus comprises:
- a detecting means for detecting a light beam reflected by an information recording medium used in said optical information recording/reproducing apparatus;
- an amplifying means comprising a plurality of amplifiers;
- a coupling means for coupling said plurality of amplifiers in series with each other; and
- a gain decreasing means for selectively decreasing a gain of a signal produced by said detecting means for a recording/erasing time period during which information data is recorded or erased in said optical information recording/reproducing apparatus.

As stated in the above, in the information signal reproducing circuit according to the present invention, it is possible to decrease a gain of signal generated in the photo detector during when information data is recorded or erased in the optical information recording/reproducing apparatus. Therefore, in case the amplifiers of the circuit are connected to each other by means of AC couplings, it is possible to settle the time constant of the AC couplings at desired values, and then the influence of the transient of the capacities of the AC couplings can be effectively removed. Thus, the preformat information and data information recorded in the data region can be reproduced in a correct manner regardless of the characteristics of the optical information recording medium. Further, in case the amplifiers are connected to each other by means of DC couplings, it is possible to prevent to saturate and latch up the amplifiers even when DC offset or DC drift is caused in the circuit.

DESCRIPTION OF THE PREFERRED EMBODIMENTS

Figure 5:
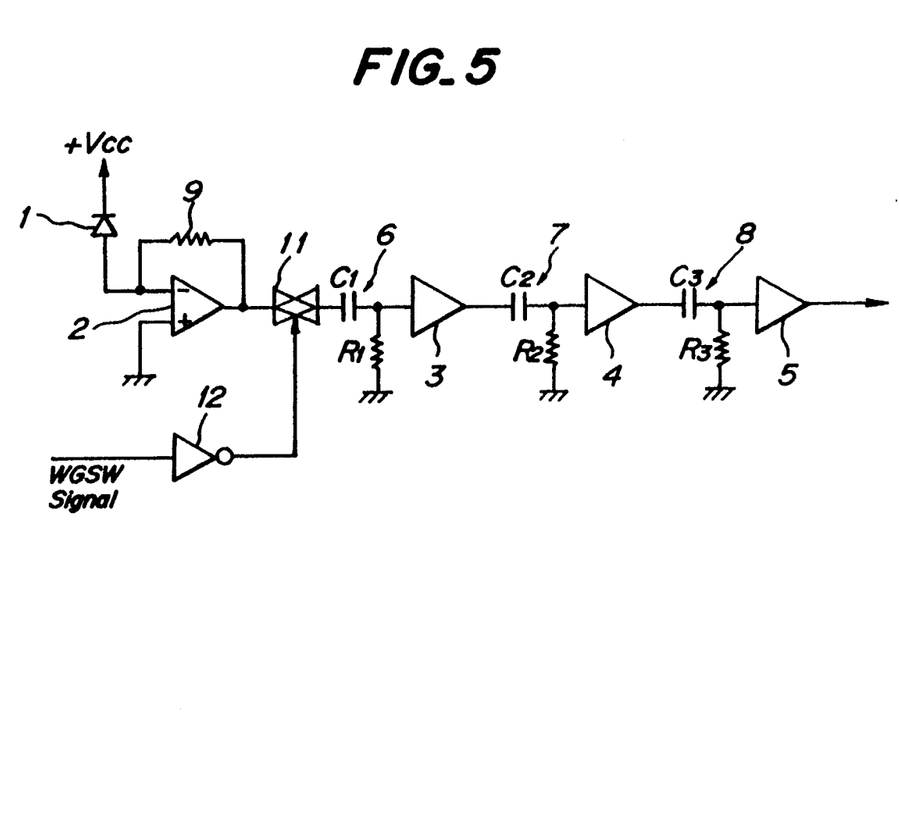
FIG. 5 is a schematic view representing a construction of a first embodiment of information signal reproducing circuit according to the present invention.
Figures 6A, 6B, 6C:
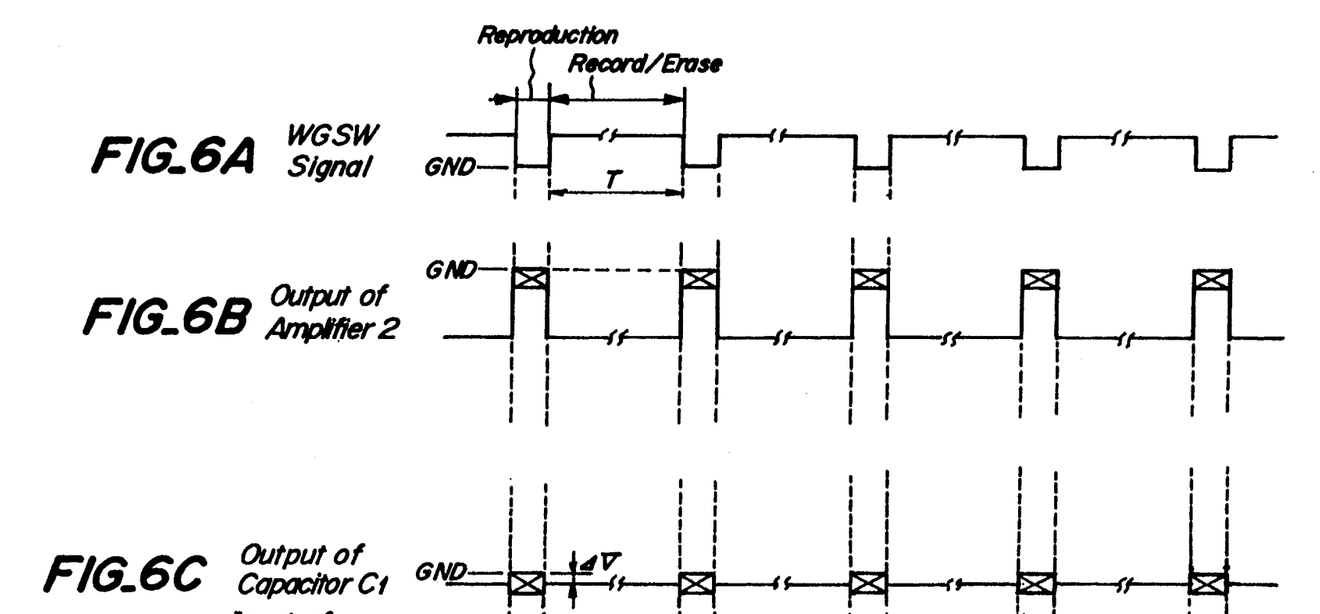
FIG. 6A is a schematic view showing a waveform of a WGSW signal supplied to the circuit represented in FIG. 5.
FIG. 6B is a schematic view depicting a waveform of an output signal of a first amplifier of the circuit represented in FIG. 5.
FIG. 6C is a schematic view illustrating a waveform of an output signal of a first capacitor of the circuit represented in FIG. 5.

FIG. 5 is a schematic view showing a construction of a first embodiment of an information signal reproducing circuit according to the present invention. The first embodiment has almost the same construction as that of the conventional circuit shown in FIG. 1 excepting that an analog switch 11 having a high frequency band is provided between the first amplifier 2 formed by a differential amplifier and the capacitor C1 of the first AC coupling 6, and a WGSW signal, whose waveform is depicted in FIG. 6A, is supplied to the analog switch 11 via an inverter 12 being synchronized with a timing at which the operational mode is varied between an information reproducing mode and an information recording/erasing mode in the optical information recording-/reproducing apparatus. The analog switch 11 is controlled to be made ON when information data is reproduced in the apparatus and is made OFF when information data is recorded or erased. It should be noted that the time constants (C1R1, C2R2, C3R3) of the AC couplings 6 to 8 are settled so as to satisfy the following conditions.

$$1/T < \tfrac{1}{2}\pi C1R1 < f_0$$

$$[\tfrac{1}{2}\pi C2R2, \tfrac{1}{2}\pi C3R3] < f_0$$

Figure 6D:
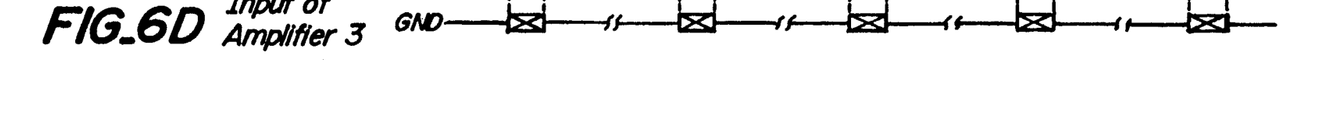
FIG. 6D is a schematic view showing a waveform of an input signal of a second amplifier of the circuit represented in FIG. 5.

In the first embodiment, the output signal of the first amplifier 2 is varied in accordance with the output of the photo detector 1, as shown in FIG. 6B. But, since the analog switch 11 is controlled to be made OFF in response to the WGSW signal during a period when information data is recorded or erased in the apparatus, the charge/discharge of the first capacitance C1 of the first AC coupling 6, which is caused by a large variable voltage in DC component of the output of the first amplifier 2, is effectively restrained; and only an extremely small DC voltage component $\Delta V$ is charged in the first capacitor C1, as shown in FIG. 6C. In FIG. 6C, there is represented a waveform of the output signal of the first capacitor C1. Additionally, an electric charge corresponding to the voltage $\Delta V$ stored in the capacitor C1 is not discharged at all, because the analog switch 11 is made OFF during a time period T and the impedance of the second amplifier 3 becomes high due to the existence of the analog switch 11. Therefore, the input signal of the second amplifier 3 is not influenced by the transient of the AC coupling 6, as shown in FIG. 6D; and preformat information and information data recorded in the data region following the preformat information recording region can be always reproduced in a correct manner.

Figures 7, 8A:
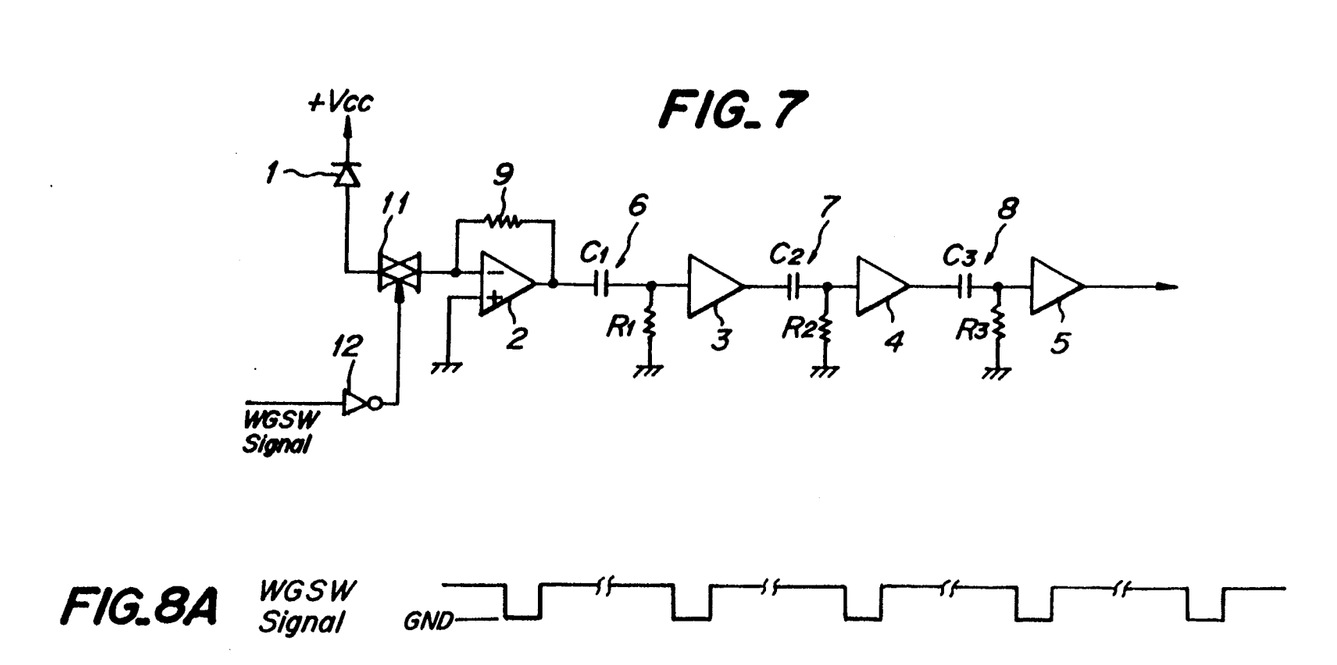
FIG. 7 is a schematic view depicting a construction of a second embodiment of information signal reproducing circuit according to the present invention.
FIG. 8A is a schematic view illustrating a waveform of WGSW signal supplied to the circuit depicted in FIG. 7.

FIG. 7 is a schematic view depicting a second embodiment of the information signal reproducing circuit of the present invention. In the second embodiment, the analog switch 11 for use in high frequency band is provided between the photodetector 1 and the first amplifier 2. The analog switch 11 is arranged to be controlled in such a manner that when information data is reproduced in the optical information recording/reproducing apparatus the switch 11 is made ON and when information data is recorded or erased the switch 11 is made OFF. The switch 11 is controlled by the WGSW signal, which is supplied to the switch 11 via the inverter 12 (FIG. 8A). In this arrangement, when information data is recorded or erased in the information recording/reproducing apparatus, the output current of the photo detector 1 is not supplied to the feedback resistor 9 of the first amplifier 2. It should be noted that the time constants of respective AC couplings 6 to 8 (C1R1, C2R2, C3R3) are set so as to satisfy the following conditions.

$$1/T < \tfrac{1}{2}\pi C1R1 < f_0$$

$$[\tfrac{1}{2}\pi C2R2, \tfrac{1}{2}\pi C3R3] < f_0$$

Figure 8B:
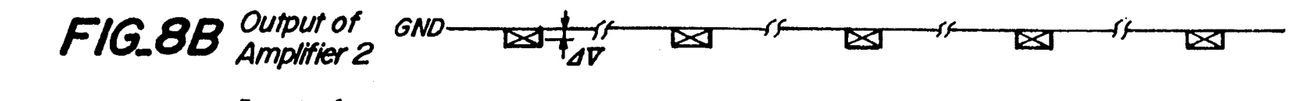
FIG. 8B is a schematic view representing a waveform of an output signal of a first amplifier of the circuit depicted in FIG. 7.
Figure 8C:
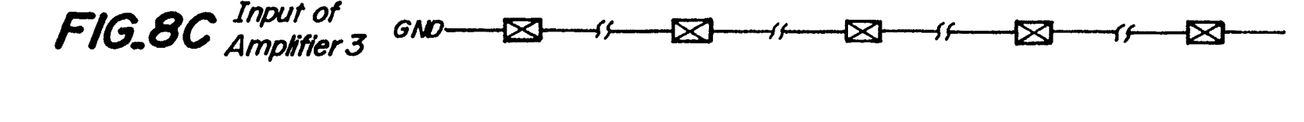
FIG. 8C is a schematic view showing a waveform of an input signal of the second amplifier of the circuit depicted in FIG. 7.

According to the second embodiment, the output of the first amplifier 2 is varied in response to the WGSW signal, as shown in FIGS. 8A and 8B; there is generated a potential difference $\Delta V$ in DC level in the output signal of the second amplifier 2 when the operational mode is changed in the information recording/reproducing apparatus. Thus, the capacitor C1 of the first AC coupling 6 is charged and discharged in response to the potential difference $\Delta V$, and there is generated a transient in the input signal of the second amplifier 3. However, the potential difference $\Delta V$ of the output of the first amplifier 2 is smaller than that of the output of the second amplifier 2 of the conventional circuit (ref. FIG. 2) because the DC level when the preformat information data is reproduced is very low. Therefore, the input signal of the second amplifier 3 is scarcely influenced by the transient of the capacitor C1, as shown in FIG. 8C, so preformat information and information data recorded in the data region following the preformat information recording region can be reproduced in a correct manner as well as the first embodiment.

Figure 9:
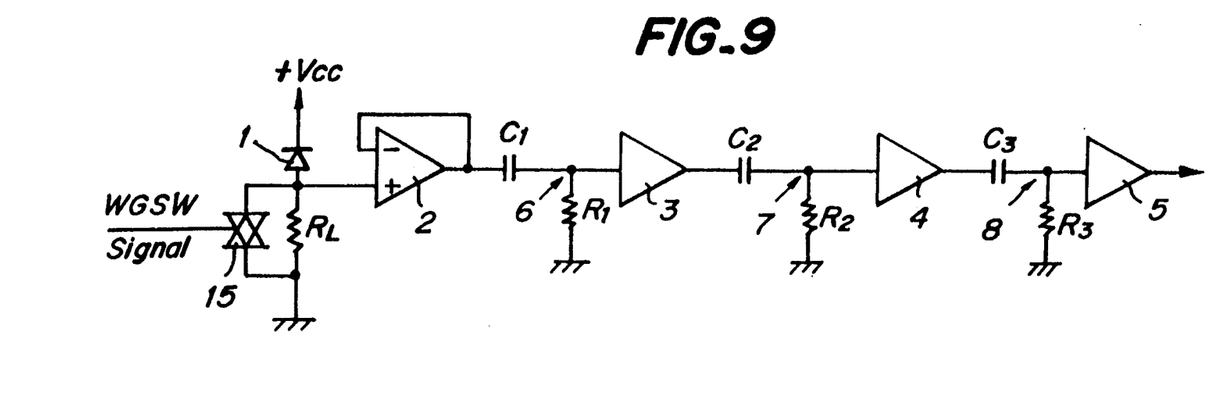
FIG. 9 is a schematic view illustrating a construction of a third embodiment of information signal reproducing circuit according to the present invention.
Figure 10A:
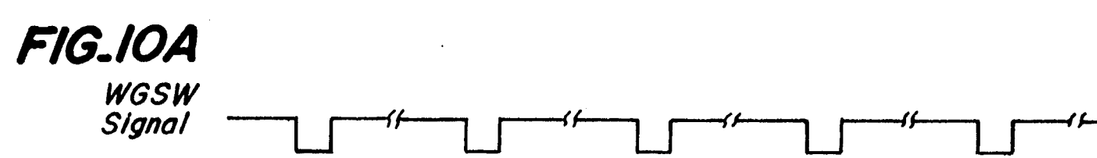
FIG. 10A is a schematic view representing a waveform of WGSW signal supplied to the circuit illustrated in FIG. 9.
Figures 10B, 10C:
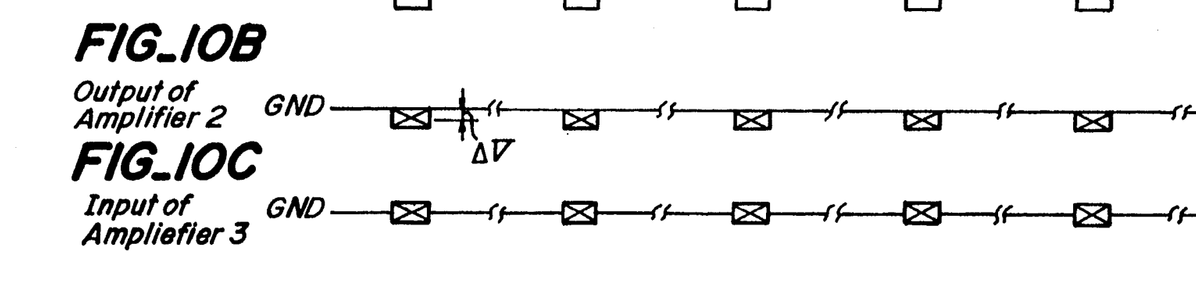
FIG. 10B is a schematic view showing a waveform of an output signal of a first amplifier of the circuit illustrated in FIG. 9.
FIG. 10C is a schematic view depicting a waveform of an input signal of the second amplifier of the circuit illustrated in FIG. 9.

FIG. 9 is a schematic view illustrating a third embodiment of the information signal reproducing circuit of the present invention. In the third embodiment, the output terminal of the photo detector 1 is connected to a non-inverted input terminal of the first amplifier 2; the non-inverted input terminal is further connected to the ground by means of resistor $R_L$; and an analog switch 15 is connected across the resistor $R_L$. The analog switch 15 is controlled in accordance with the WGSW signal, whose waveform is illustrated in FIG. 10A, such that when information data is reproduced in the apparatus, the switch 15 is made OFF and when information data is recorded or erased, the switch 15 is made ON, so an input terminal of the capacitor C1 of the first AC coupling 6 is connected to the GND level. It should be noted that the time constants of the respective AC couplings (C1R1, C2R2, C3R3) can be set at will without taking account of the recording/erasing time period T; and that an inverted terminal of the first amplifier 2 is connected to an output terminal thereof so as to operate the amplifier 2 as a voltage amplifier.

In the third embodiment, when information is recorded or erased in the apparatus, the capacitor C1 of the first AC coupling 6 is charged and discharged to produce the electric charge $\Delta V$, and the input signal of the second amplifier 3 is influenced by the transient generated in the capacitor C1. However, as well as the second embodiment, the potential difference $\Delta V$ of the output of the first amplifier 2 is very small, so that it is possible to reproduce the preformat information and following information data without being influenced by the transient of the first AC coupling. Additionally, in the third embodiment, the analog switch 15 is provided only for connecting the capacitor C1 to the GND level but does not serve to transfer the information signal to the following amplifier. Therefore, it is not necessary to use an expensive switch having the high frequency band, but a cheep analog switch or a digital switch can be used therefor.

Figure 11:
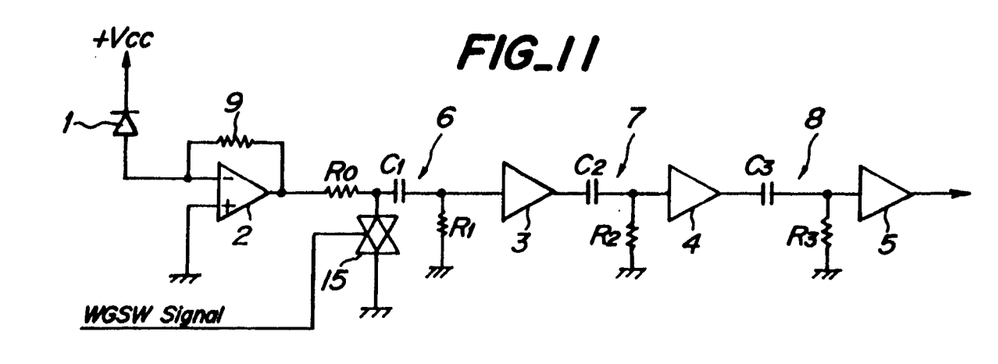
FIG. 11 is a schematic view representing a construction of a fourth embodiment of information signal reproducing circuit according to the present invention.
Figure 12A:
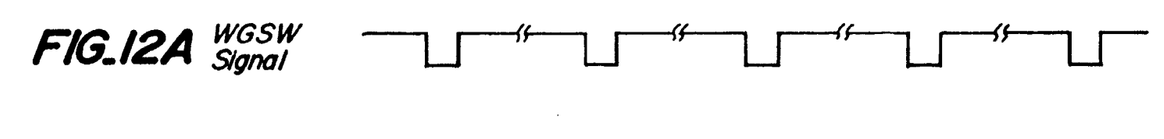
FIG. 12A is a schematic view showing a waveform of WGSW signal supplied to the circuit represented in FIG. 11.
Figure 12B:
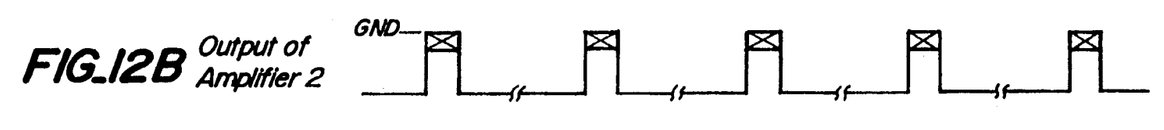
FIG. 12B is a schematic view depicting a waveform of an output signal of a first amplifier of the circuit represented in FIG. 11.
Figure 12C:
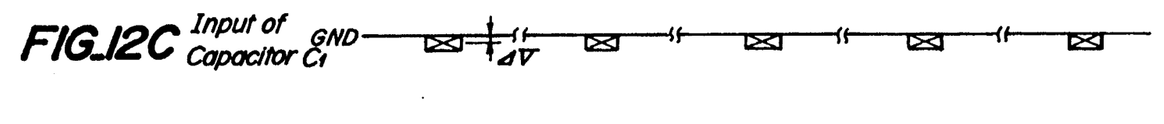
FIG. 12C is a schematic view illustrating a waveform of an input signal of a first capacitor of the circuit represented in FIG. 11.
Figure 12D:
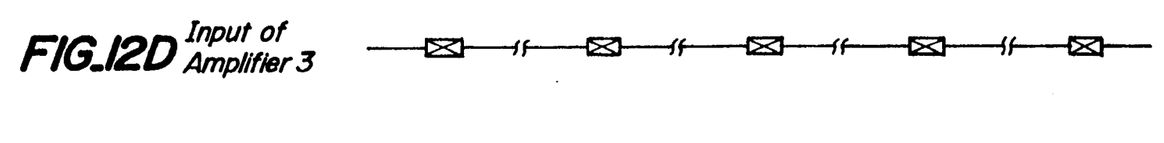
FIG. 12D is a schematic view showing a waveform of an input signal of a second amplifier of the circuit represented in FIG. 11.

FIG. 11 is a schematic view representing a construction of the fourth embodiment of the information signal reproducing circuit according to the present invention. In the fourth embodiment, a resistor $R_0$ is connected between the output terminal of the first amplifier 2 and the capacitor C1; and a connection point between the resistor $R_0$ and the capacitor C1 is connected to the GND by means of the analog switch 15. The analog switch 15 is controlled by the WGSW signal shown in FIG. 12A such that when information data is reproduced, the switch 15 is made OFF and when information data is recorded or erased, the switch 15 is made ON. Therefore, when the switch 15 is made ON, the input terminal of the capacitor C1 is connected to the GND level.

FIGS. 12A to 12D represent waveforms of the WGSW signal, the output signal of the first amplifier 2 the input signal of the capacitor C1 and the input signal of the second amplifier 3, respectively. As apparent from these figures, the same effect of the third embodiment can be obtained in the fourth embodiment. Also, in the present embodiment, a cheep analog or digital switch can be used for the analog switch 15.

Figure 13:
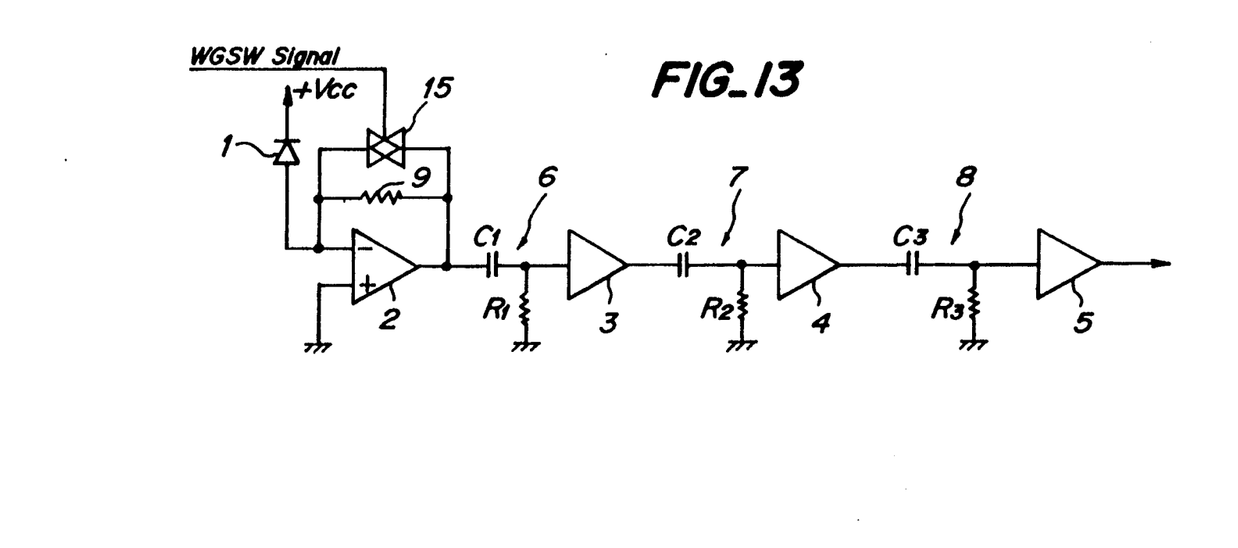
FIG. 13 is a schematic view depicting a construction of a fifth embodiment of information signal reproducing circuit according to the present invention.

FIG. 13 is a schematic view showing a construction of the fifth embodiment of the information signal reproducing circuit of the present invention. In the fifth embodiment, the analog switch 15 is arranged in parallel with the feedback resistor 9 of the first amplifier 2. The switch 15 is arranged to be controlled such that the switch 15 is made OFF when information data is reproduced and the switch 15 is made ON when information data is recorded or erased, in accordance with WGSW signal (FIG. 14A); and thus the input terminal of the first capacitor C1 is connected to the GND level by means of the switch 15 for a time period during which information data is recorded or erased.

Figures 14A, 14B, 14C:
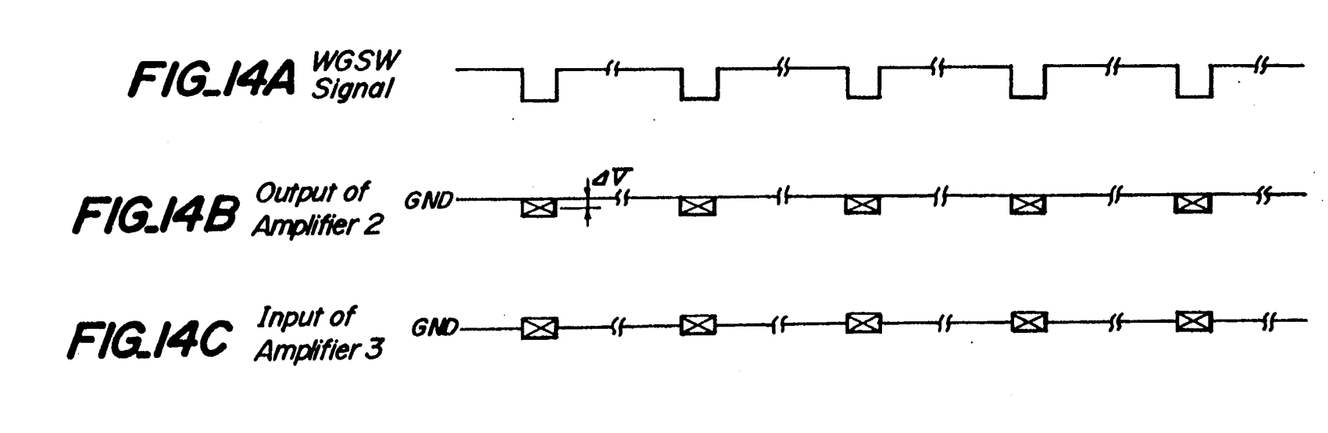
FIG. 14A is a schematic view illustrating a waveform of WGSW signal supplied to the circuit depicted in FIG. 13.
FIG. 14B is a schematic view representing a waveform of an output signal of a first amplifier of the circuit depicted in FIG. 13.
FIG. 14C is a schematic view showing a waveform of an input signal of a second amplifier of the circuit depicted in FIG. 13.

FIGS. 14B and 14C show waveforms of the output signal of the first amplifier 2 and the input signal of the second amplifier 3, respectively. As clear from these figures, the same effect as the third embodiment can be obtained by the arrangement of the fifth embodiment. Additionally, as well as the third and fourth embodiment, the cheep analog switch or the digital switch can be instead of the expensive analog switch having the high frequency band.

Figure 15:
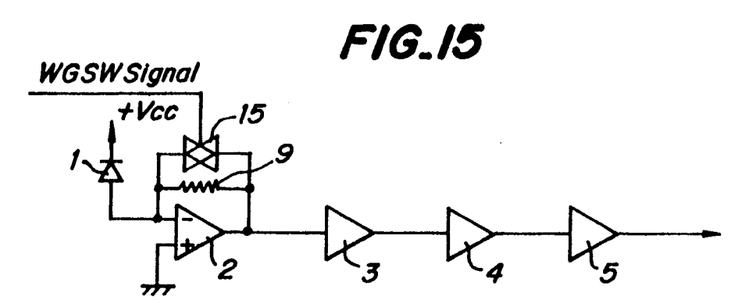
FIG. 15 is a schematic view illustrating a construction of sixth embodiment of the information signal reproducing circuit according to the present invention.

FIG. 15 is a schematic view depicting a construction of the sixth embodiment of the information signal reproducing circuit of the present invention. In this embodiment, respective amplifiers 2, 3, 4 and a wave shaping circuit 5 are connected to each other in series by means of DC couplings. As stated in the above, in case that the amplifiers and the wave shaping circuit are connected to each other by means of DC couplings, there is a drawback that when DC offset or DC drift is generated in the information signal, the amplifiers are sometimes latched up due to the saturation.

In order to solve this drawback, in the sixth embodiment, the analog switch 15 is arranged in parallel with the feedback resistor 9 of the first amplifier 2; and the WGSW signal is supplied to the analog switch 15. The analog switch 15 is controlled such that when information data is reproduced, the switch 15 is made OFF and information data is recorded or erased, the switch 15 is made ON in accordance with the WGSW signal. Therefore, when the analog switch 15 is made ON, the gain of the first amplifier 2 becomes zero.

Figure 16A:
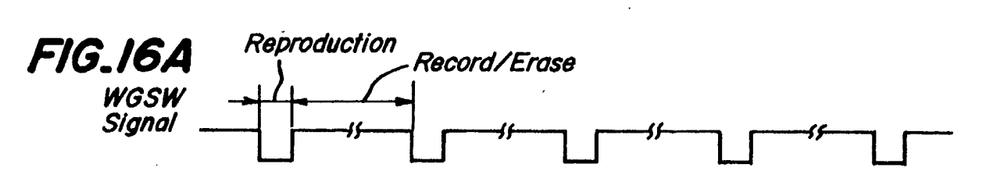
FIG. 16A is a schematic view representing a waveform of WGSW signal supplied to the circuit illustrated in FIG. 15.
Figure 16B:
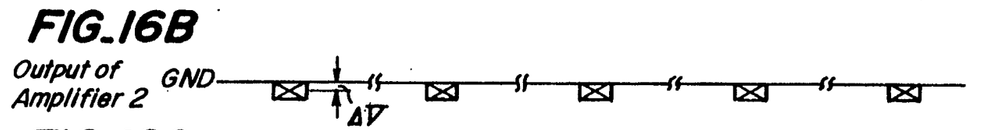
FIG. 16B is a schematic view showing a waveform of an output signal of a first amplifier of the circuit illustrated in FIG. 15.
Figure 16C:
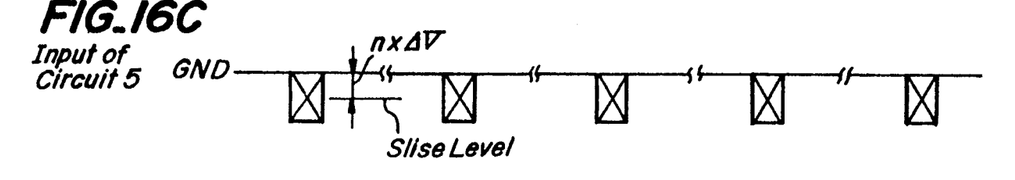
FIG. 16C is a schematic view depicting a waveform of an input signal of a waveform shaping circuit of the circuit illustrated in FIG. 15.

FIGS. 16B and 16C show waveforms of the output signal of the first amplifier 2 and the input signal of the wave shaping circuit 5 of the sixth embodiment. As clear from these figures, according to the sixth embodiment, even when DC offset or DC drift is caused in the information signal, the DC component of the reproduction signal is small; and thus the information signal can be reproduced without causing the latch-up of the amplifiers.

As explained in detail in the above, according to the present invention, a gain of information signal which is supplied from the photodetector 1 to the following amplifiers and the waveform shaping circuit is decreased during the recording/erasing operation. Therefore, in case the amplifiers are connected in series with each other by means of AC couplings, the time constants of the AC couplings can be established as desired; and preformat information data which is read out just after recording or erasing of information data is finished, and the information reproducing signal which is written in the data region following the preformat information recording region can be correctly reproduced without being influenced by the transient of the capacitor of the AC coupling and the characteristic of the information recording medium. Additionally, in case the amplifiers are connected to each other by means of DC couplings, even when the DC offset or DC drift is generated in the information signal, preformat information and information data can be reproduced without causing a latch-up phenomenon.

What is claimed is:

1. An information signal reproducing circuit for use in an optical information recording and reproducing apparatus, comprising:
- a detecting means for detecting a light beam reflected by an information recording medium used in said optical information recording and reproducing apparatus;
- an amplifying means for amplifying a signal produced by said detecting means, said amplifying means comprising a plurality of amplifiers including a first amplifier which receives said signal produced by said detecting means;
- a coupling means for coupling said plurality of amplifiers in series with each other, said coupling means comprising at least one AC coupling; and
- cut-off means for cutting off a supply of an input signal to said at least one AC coupling for a recording or erasing time period during which information is recorded or erased in said optical information recording and reproducing apparatus.

2. An information signal reproducing circuit according to claim 1, wherein:
- said coupling means comprises a plurality of AC couplings each of which is arranged between successive ones of said amplifiers.

3. An information signal reproducing circuit according to claim 2, wherein:
- said coupling means comprises a first AC coupling between said first amplifier and an immediately succeeding one of said plurality of amplifiers; and
- said cut-off means cuts-off said supply of said input signal to said first AC coupling during said recording/erasing time period.

4. An information signal reproducing circuit according to claim 2, wherein:
- said cut-off means cuts-off said supply of said input signal to said first amplifier during said recording or erasing time period.

5. An information signal reproducing circuit according to claim 3, wherein:
- said cut-off means is provided between said first amplifier and said first AC coupling.

6. An information signal reproducing circuit according to claim 5, wherein:
- said cut-off means comprises an analog switch arranged between said first amplifier and a capacitor of said first AC coupling; to said analog switch being supplied a control signal, which is generated in synchronized with timings at which an operation mode of said information recording and reproducing apparatus is changed between an information reproducing mode and an information recording or erasing mode;
- whereby said analog switch is made OFF during said information recording or erasing mode.

7. An information signal reproducing circuit according to claim 5, wherein:
- said cut-off means comprises a resister arranged between said first amplifier and a capacitor of said first AC coupling, and an analog switch connected between a connection point of said resistor and said capacitor and a ground potential point, to said analog switch being supplied a control signal, which is generated in synchronized with timings at which an operation mode of said information recording/reproducing apparatus is changed between an information reproducing mode and an information recording/erasing mode;
- whereby said analog switch is mode ON during said information recording/erasing mode.

8. An information signal reproducing circuit according to claim 4, wherein:
- said cut-off means is provided between said photo detector and said first amplifier.

9. An information signal reproducing circuit according to claim 8, wherein:
- said cut-off means comprises an analog switch arranged between said photo detector and said first amplifier, to said analog switch being supplied control signal which is generated in synchronized with timings at which an operation mode of said information recording and reproducing apparatus is changed between an information reproducing mode and an information recording or erasing mode;
- whereby said analog switch is made OFF during said information recording or erasing mode.

10. An information signal reproducing circuit according to claim 8, wherein:
- said cut-off means comprises a resistor arranged between a connection point of said photo detector and said first amplifier and a ground level point, and an analog switch connected across said resistor, to said analog switch being supplied a control signal which is generated in synchronized with timings at which an operation mode of information recording and reproducing apparatus is changed between an information reproducing mode and an information recording or erasing mode;
- whereby said analog switch is made ON during said information recording or erasing mode.

11. An information signal reproducing circuit according to claim 3, wherein:
- said cut-off means is provided in said first amplifier.

12. An information signal reproducing circuit according to claim 3, wherein:
- said first amplifier comprises a differential amplifier having an inverted input terminal, a non-inverted input terminal and an output terminal;
- a feed back resistor is connected between said output terminal and said inverted input terminal of said first amplifier;
- said cut-off means comprises an analog switch; and
- said information reproducing circuit further comprises a control means for generating a control signal that is provided to said analog switch and is synchronized with timings at which an operation mode of an information recording and reproducing apparatus is changed between an information reproducing mode and an information recording or erasing mode;
- whereby said analog switch is caused to be ON during said information recording or erasing mode so that a gain of said first amplifier is decreased.

13. An information signal reproducing circuit for use in an optical information recording and reproducing apparatus, comprising:
- a detecting means for detecting a light beam reflected by an information recording medium used in said optical information recording and reproducing apparatus;
- an amplifying means for amplifying a signal produced by said detecting means, said amplifying means comprising a plurality of amplifiers including a first amplifier which receives said signal produced by said detecting means;

a coupling means for coupling said plurality of amplifiers in series with each other;

a feedback resistor connected between an input and an output of said first amplifier; and a cut-off means for cutting off a supply of an input signal to said coupling means for a recording or erasing time period during which information is recorded or erased in said optical information recording and reproducing apparatus, said cut-off means comprising a switching means connected in parallel with said feedback resistor, said switching means being controlled to be closed during said recording or erasing time period.

14. An information signal reproducing circuit according to claim 13, wherein:

said coupling means comprises a plurality of AC couplings each of which is arranged between successive ones of said amplifiers.

15. An information signal reproducing circuit according to claim 13, wherein:

said coupling means comprises a plurality of DC couplings each of which is arranged between successive amplifiers.

16. An information signal reproducing circuit according to claim 15, wherein:

said switching means is provided in said first amplifier.

17. An information signal reproducing circuit according to claim 16, wherein:

said first amplifier comprises a differential amplifier having an inverted input terminal, a non-inverted input terminal and an output terminal, and said feed back resistor connected between said output terminal and said inverted input terminal of said first amplifier; and said switching means comprises an analog switch connected across said feedback resistor, to said analog switch being supplied a control signal which is generated in synchronized with timings at which an operation mode of information recording and reproducing apparatus is changed between an information reproducing mode and an information recording or erasing mode;

whereby said analog switch is mode ON during said information recording or erasing mode so that a gain of said first amplifier is decreased.

* * * * *